J. L. REED.
Pulley-Block.
No. 220,548. Patented Oct. 14, 1879.
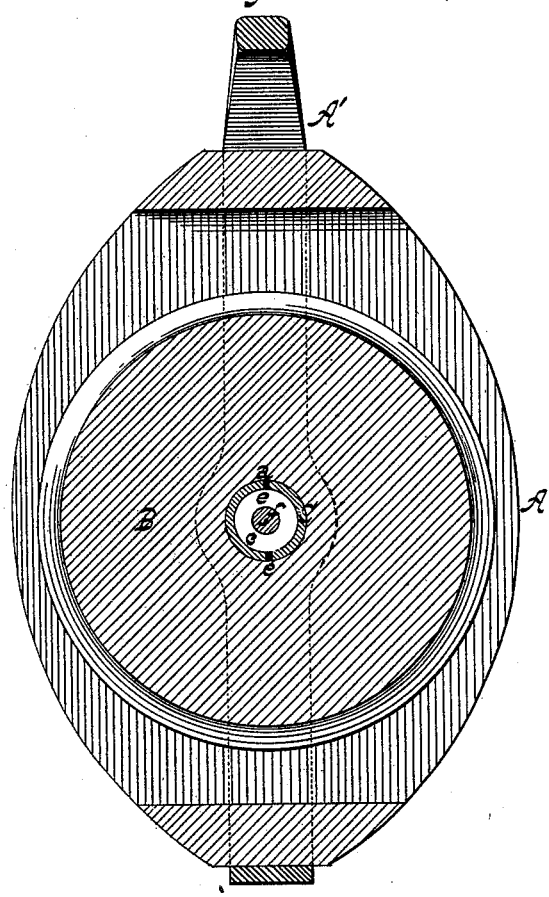
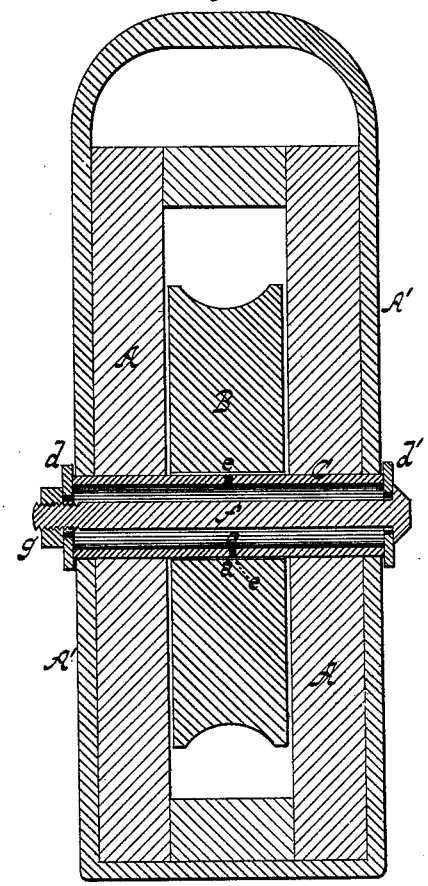
Witnesses:
Charles Seerick
C. D. Paul
John L. Reed
by his Atty
Alex. Selkirk
Inventor.

UNITED STATES PATENT OFFICE.

JOHN L. REED, OF CANAJOHARIE, NEW YORK.

IMPROVEMENT IN PULLEY-BLOCKS.

Specification forming part of Letters Patent No. 220,548, dated October 14, 1879; application filed February 20, 1879.

*To all whom it may concern:*

Be it known that I, JOHN L. REED, of Canajoharie, in the county of Montgomery and State of New York, have invented a new and useful Improvement in Pulley-Blocks, of which the following is a specification.

This invention relates to self-lubricating pulley-blocks. Heretofore this class of pulley-blocks has been made very complicated, by reason of the many parts entering into their construction, and had their reserve lubricating-chamber so constructed and situated that only fluid substances could be introduced and employed. These reserve lubricating-chambers have been situated in the sheave, or in a band or bushing in the sheave, with bands or bushings interposed between such chambers and the axle on which the sheaves revolve.

In some cases the fluid lubricating substance was introduced to the reserve chamber by means of an angular duct leading from one end of the axle to a short distance within and terminating into a duct passing radially therefrom to communicate with ducts made into an annular bushing, and leading thence through ducts made in a second bushing to an annular chamber made in the sheave.

In other cases the fluid lubricating substance was introduced into a reserve lubricating-chamber made in the sheave by a duct made in the outer shell of the hub of the sheave, while the fluid lubricating substance was discharged on a solid axle by means of fibrous material through a duct made in the bushing, separating the reserve chamber from the axle.

Both these means for lubricating the axle were objectionable, for the reason that they required that the lubricating substance to be employed should be in every case of a liquid form, which form is only adapted to be used with metal sheaves, which become more or less warmed by friction and exposure to the rays of the sun. This renders the liquid lubricating substance more thin and free to run through the joints of the parts of the pulley-block, and escape without being used as intended, thereby requiring to be more often supplied.

Another objection to these methods is that the particles of metal worn from the frictional surfaces in contact would, with the oil, in a short time gum up the several parts, and thereby prevent the sheave from running as freely on its axle as it would otherwise, while if neglected to be regularly supplied with oil, the sheave and axle would cut each other and soon render the means for lubricating the axle useless.

Another objection to such pulley-blocks is that they could not retain their liquid lubricating substance for any great length of time when laid away idle.

The object of my invention is to provide a means by which lubricating substance of a solid form will be employed for reducing the friction of the sheave with the axle, and be employed with wooden sheaves, and be fed to the surfaces to be lubricated in quantities proportionate to the friction on the axle; and, further, to so secure the solid-form lubricating substance in its chamber that it cannot escape therefrom when the pulley-block is lying on its side or idle.

My invention consists in the combination and arrangement, with the sheave and frame, of a tubular axle having one or more small perforations through its wall or shell at a point or points opposite the eye of the sheave, and its ends closed by closing-washers and a nutted bolt passing longitudinally and centrally through both the washers and the axle, and capable of being readily opened by the removal of the closing-washers for the introduction of tallow or other solid lubricating material, as may be required.

In the accompanying drawings, in which similar letters of reference indicate like parts, Figure 1 is a sectional elevation of my improved pulley-block, and Fig. 2 is a cross-sectional view taken in the transverse.

The pulley frame or body of the block A is made of wood or metal, or both combined, as has been the practice of the trade. When the said pulley-frame is made of wood I employ the metal strap A' to hold the several parts together, or, if selected, the said strap may be made of rope, as heretofore employed.

B is the sheave or pulley, made of wood in the usual form, and provided with a central hole, *a*, nicely fitting the axle C. The axle C is made hollow, so as to be provided with a chamber, *c*. At about the middle of the length of said axle are made one or more perforations $e$, which extend through the shell of the chambered axle, and communicate from chamber $c$ to the outer periphery opposite to the inner surface bounding the central hole, $a$, of the sheave. The ends of the chambered axle are closed by the washers $d\ d'$, held tight against the ends of said axle by the binding-bolt $f$ and its screw-nut $g$, the said bolt being passed longitudinally through the center of the axle, as shown in Fig. 1. The chamber $c$ of the axle is filled with tallow or other well-known solid lubricating material which will melt when warmed or heated.

The manner in which my improvement operates is as follows: When the sheave B is revolved under weight the friction attendant on its motion around the chambered axle will warm or heat the same, which heat will be communicated to the tallow and melt a portion that will be in close contact with the shell of the chamber in which it is held. This melted portion will escape from said chamber through the perforation $e$, and be discharged on the surface of the bearing-hole $a$ of the sheave B, and as the friction is excessive the flow or supply of the lubricating material from the chamber $c$ will be proportionally increased, while, when the friction is lessened, the supply will be less.

When the chamber $c$ requires to be replenished with tallow or its equivalent lubricating material, the nut $g$ is to be unscrewed from off its bolt and the washer $d$ removed, when the tallow is to be introduced by either forcing it in when in a solid state, or by pouring when in a melted condition. When refilled the washer is replaced, and the screw-nut is to be run on the bolt and screwed tightly down.

What I claim as my invention is—

The combination and arrangement, with frame A and sheave B, of the tubular or chambered axle C, provided with perforation $e$, communicating from the chamber of said axle to the eye of the sheave, and the closing washers $d\ d'$ and binding-bolt $f$, in the manner described, for the purposes set forth.

JOHN L. REED.

Witnesses:
   WILLIAM F. SELKIRK,
   ALEX. SELKIRK.